June 20, 1933.  P. H. DOUGLAS  1,914,408
MOORING MAST
Filed Feb. 1, 1932  7 Sheets-Sheet 1
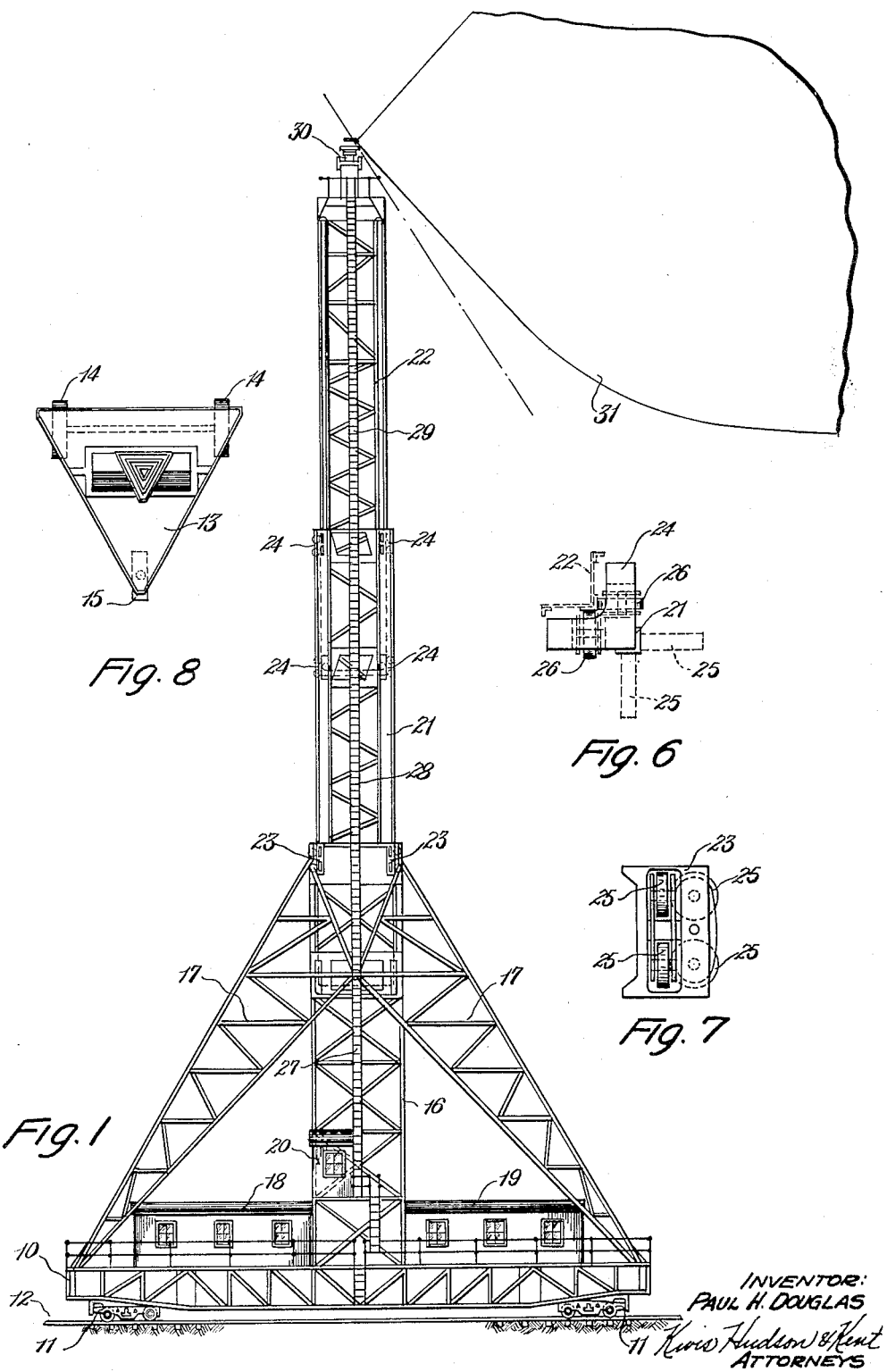

June 20, 1933.  P. H. DOUGLAS  1,914,408
MOORING MAST
Filed Feb. 1, 1932   7 Sheets-Sheet 2

INVENTOR:
PAUL H. DOUGLAS
ATTORNEYS

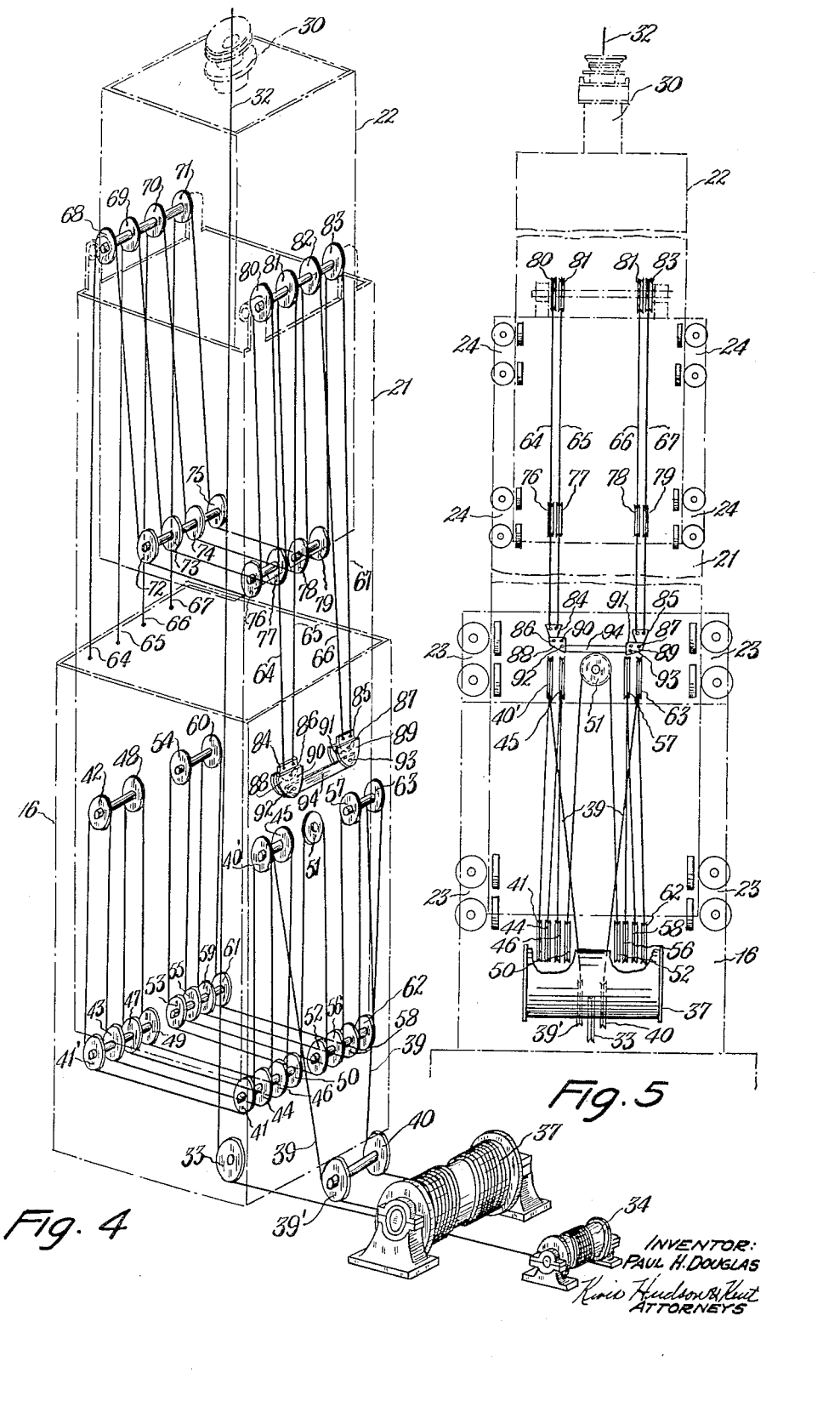

INVENTOR:
PAUL H. DOUGLAS
ATTORNEYS

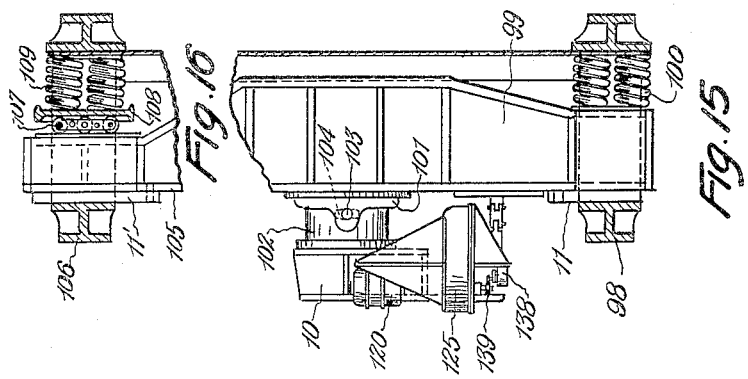
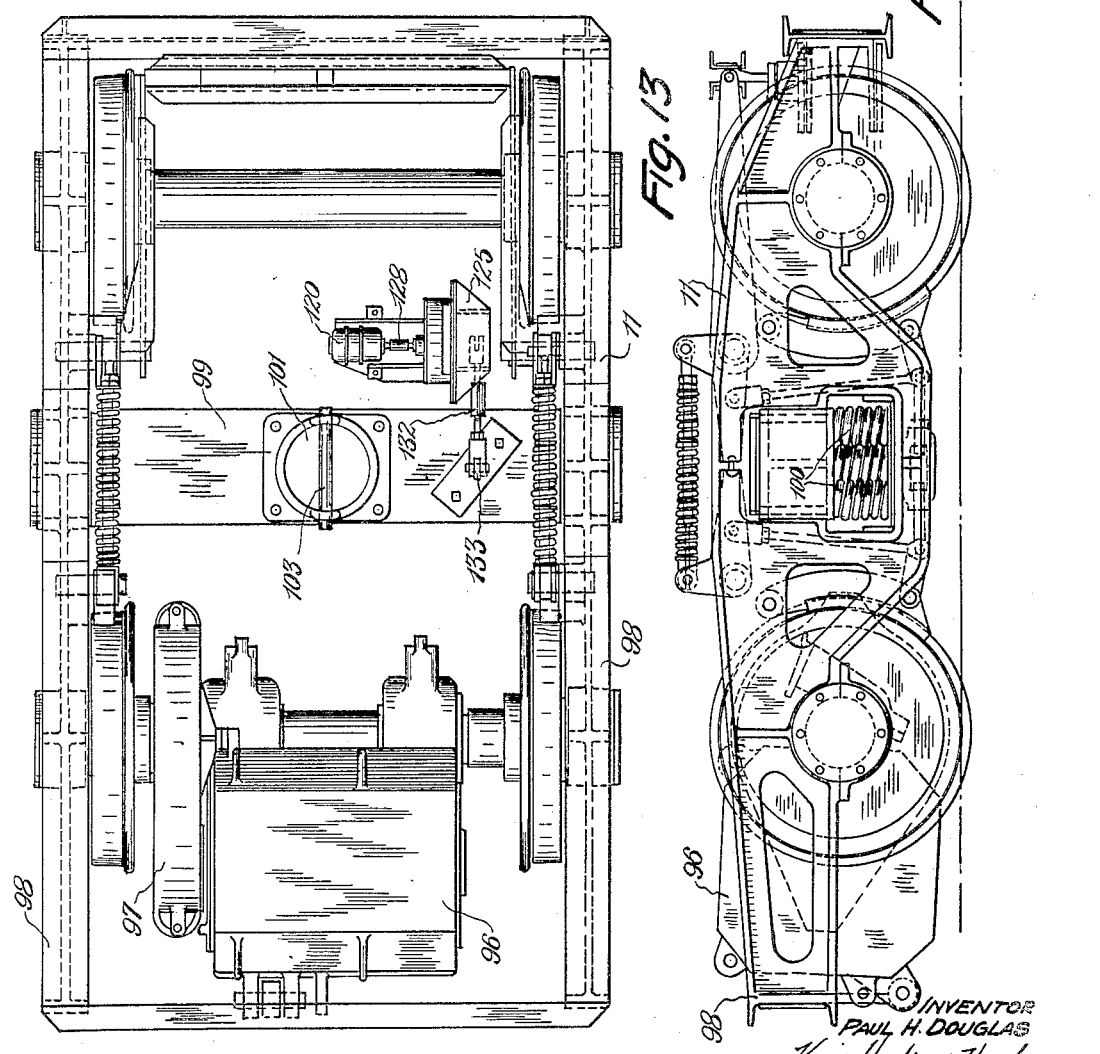

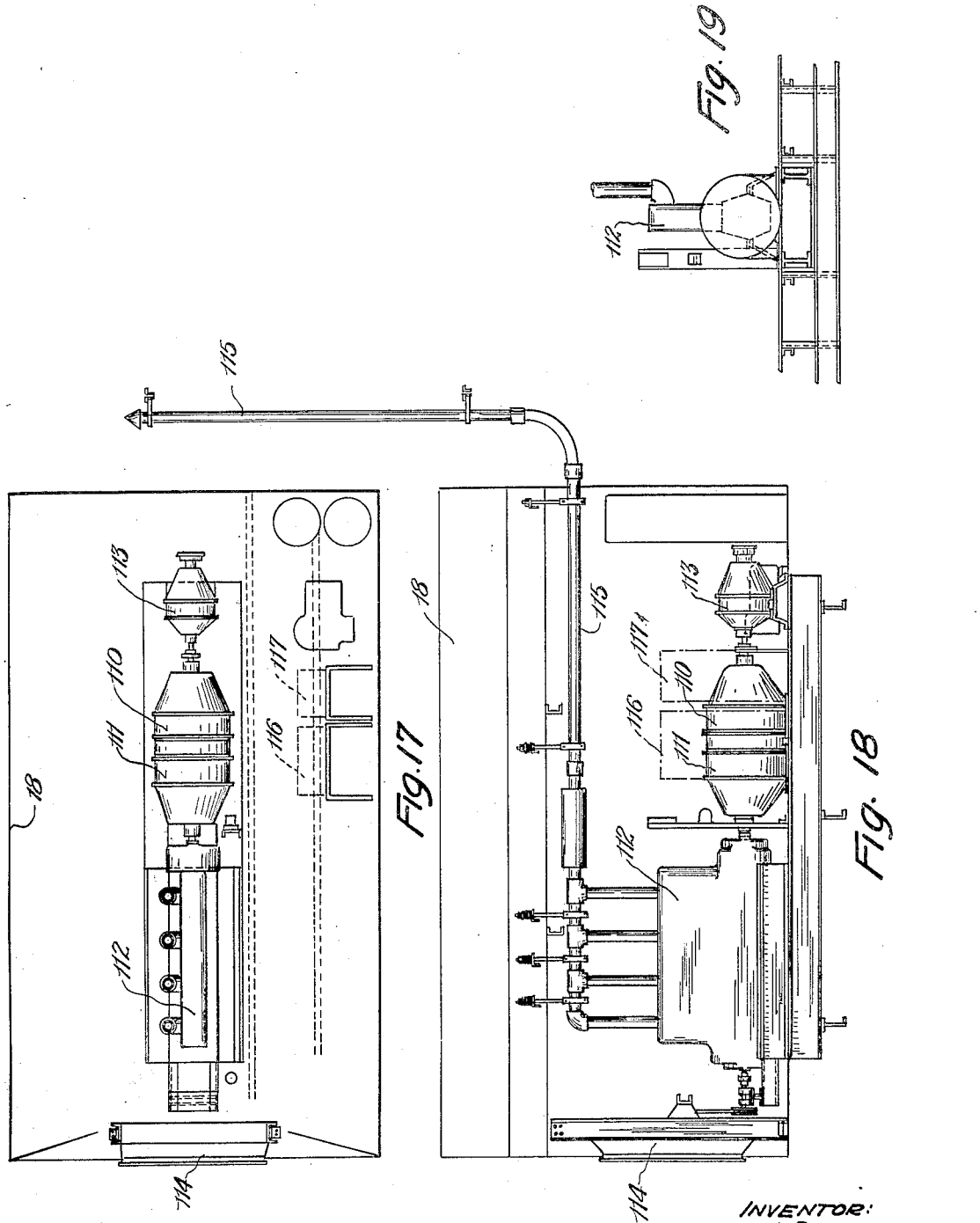

Patented June 20, 1933

1,914,408

UNITED STATES PATENT OFFICE

PAUL H. DOUGLAS, OF CLEVELAND HEIGHTS, OHIO, ASSIGNOR TO THE WELLMAN ENGINEERING COMPANY, OF CLEVELAND, OHIO, A CORPORATION OF OHIO

MOORING MAST

Application filed February 1, 1932. Serial No. 590,144.

This invention relates to mooring masts for aircraft, and, as one of its more important objects, aims to provide a mast of this kind which is capable of self-propulsion for moving an airship into or out of a hangar, and which is also capable of being extended or telescoped as desired, for carrying out with facility and safety such operations as mooring, docking, loading and unloading of airships.

Another object of the invention is the provision of an improved mooring mast embodying novel means for simplifying handling operations involved in the mooring or docking of airships, such as the lowering of a ship, and the conveying of the same, into and out of a hangar, the means here disclosed permitting easy, quick and safe mooring, regardless of the direction of the wind at the time, the direction of approach, or any shift in the direction of the wind during the mooring operation.

Another object of the invention is the provision of a suitable mooring mast mounted on a movable supporting structure or carriage, whereby either a stub mast or a high mast may be obtained, and whereby the ship may be moved into and out of a hangar, the means employed for elevating and lowering the mooring or attaching gear being of such character that a considerable range of vertical movement may be effected while the ship is attached to the mast without any part of the apparatus presenting an obstruction or hazard to the free swing of the ship about a vertical axis, due to shifting winds.

A further object of this invention is the provision of an improved mooring mast of the type referred to, which embodies novel means for extending the mast and for propelling the carriage, and which also embodies means for preventing skewing of the carriage during travel of the latter.

Other objects and features of novelty will appear as I proceed with the description of those embodiments of the invention which, for the purposes of the present application, I have illustrated in the accompanying drawings, wherein Fig. 1 is an elevational view of the movable carriage and the mast, with the latter shown in its extended or high position.

Fig. 4 is a perspective diagrammatic view illustrating the preferred form of mechanism for raising and lowering the upper sections of the mast.

Fig. 5 is a side elevation of the same, showing additionally the anti-friction guiding means for the upper sections of the mast.

Fig. 6 is a fragmental top plan view of one corner of the mast showing the guiding and steadying means.

Fig. 7 is an elevational view of one of the guiding elements.

Fig. 8 is a diagrammatic plan view of a modification.

Fig. 13 is a plan view of one of the trucks which support the mast carriage.

Fig. 14 is a side elevation thereof.

Fig. 15 is a partial transverse sectional view of the truck shown in Fig. 13.

Fig. 16 is a partial transverse sectional view of another one of the supporting trucks.

Fig. 17 is a plan view of the power generating unit.

Fig. 18 is a side elevation thereof.

Fig. 19 is an end elevation of the power generating unit.

Figure 3:
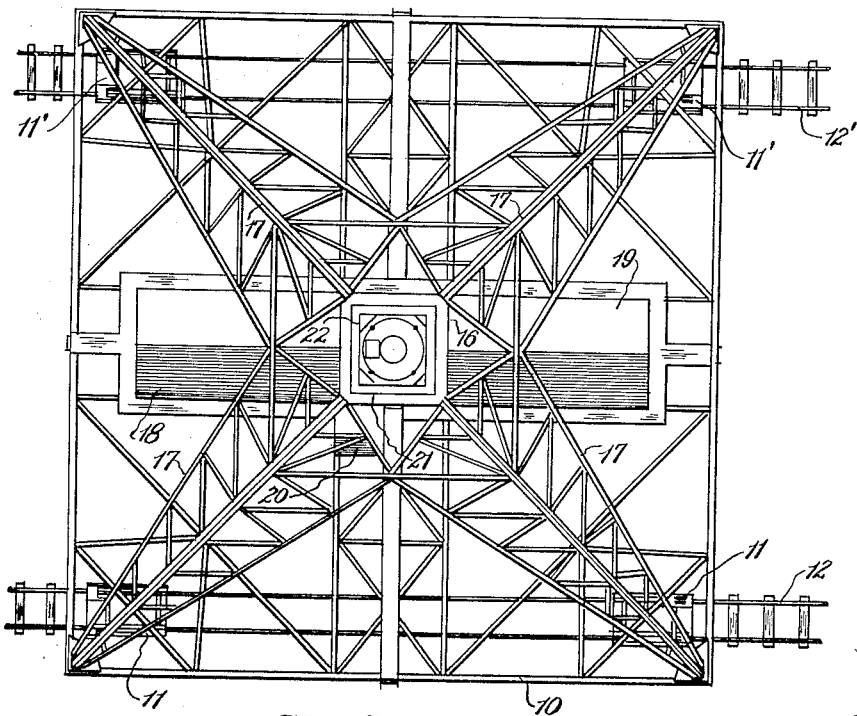
Fig. 3 is a plan view of the mast and carriage.

It is a recognized fact that the chances of accident surrounding the handling of an airship are reduced when it is moored to a high mast, that is to say, one in which the mooring or attaching gear is positioned at an elevation of one hundred and fifty feet or more above the ground level, but the discharge and taking on of passengers, screw and cargo is more readily and safely accomplished with the ship close to the ground level, where it can be held from shifting in the wind. Also, if the ship is to be docked, it must be brought as close as possible to the ground in order that it may be moved into the hangar. It is of course necessary, when docking an airship moored to a high mast of ordinary construction, to uncouple the ship from the mast, hold it by the mooring line, and then haul it down by separate means. By the use of the mast herein disclosed, the ship may be moored with the bow at a distance of one hundred and fifty feet or more above the ground level and then, while it is still free to ride with the wind, lowered until it can be secured by any suitable means forming no part of the present invention. In case of high or rapidly shifting winds, which render the lowering and docking of the ship dangerous, it may be moored to the mast in the high position, and permitted to ride out the storm until more favorable docking conditions prevail.

The employment of a self-propelling mast, such as herein disclosed, permits its entering the dock or hangar, and after being coupled to the ship, hauling it from the hangar to a convenient location for launching or casting off, without the use of any other towing or hauling devices, except such as are necessary to hold the ship against a side wind. During the mooring and docking operations the reverse of this procedure is followed, the mooring operation being preferably accomplished at a high level and the hauling and docking at a low level.

Any approved type of mooring gear or mast head coupling devices may be used with this mast, but I prefer one of the recoil or cushion type, mounted on gimbals so that it can be tilted in the direction of the airship's approach. Examples of mooring gear of this general nature may be found in Scott Patent No. 1,448,088 and Hall-Brown et al. Patent No. 1,781,010, and no detail disclosure herein is therefore thought necessary.

In the drawings I have shown at 10 a base structure or mast-supporting framework, which may be conveniently termed a carriage, and which is supported upon pairs of railway trucks 11 and 11', the latter being arranged to run, respectively, upon railway tracks 12 and 12'. The carriage is preferably square and is of considerable extent, each side being something over one-third of the height of the mast when fully extended. There are preferably four trucks, two of them running upon each of the two tracks. The carriage may be moved upon the tracks by any suitable power means external to the carriage, but I prefer to employ self-propelling means in connection with one or more of the trucks, as will be more fully disclosed hereinafter.

Figure 2:
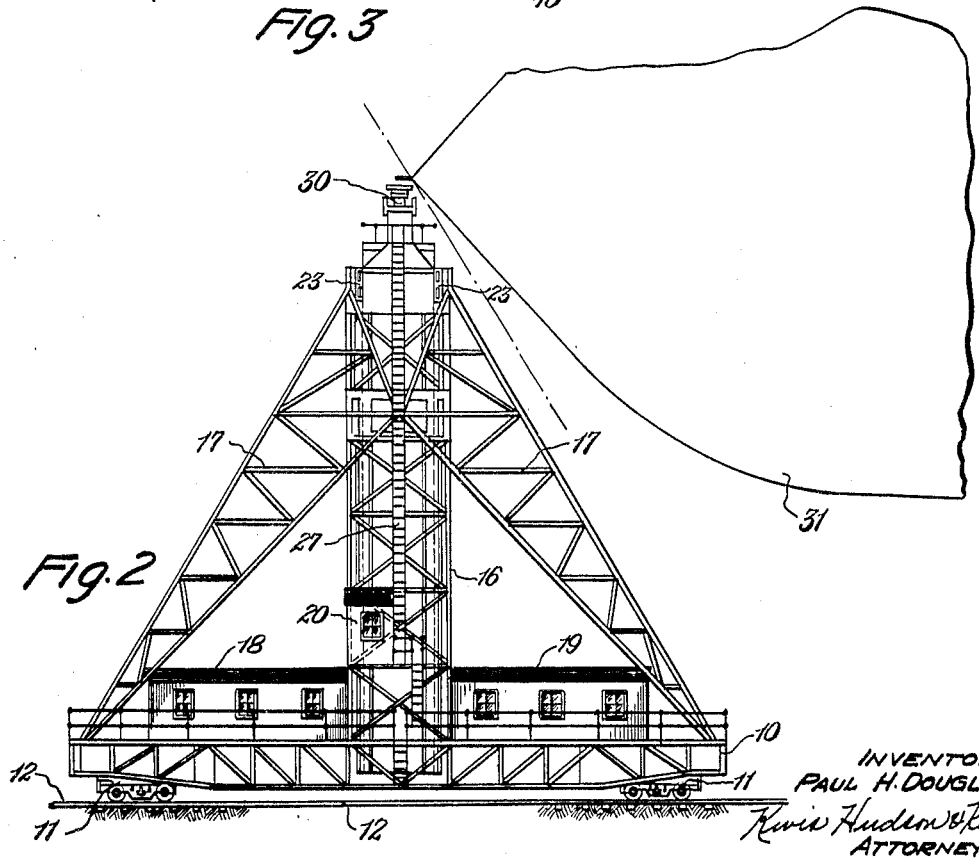
Fig. 2 is a similar view with the mast in its telescoped or low position.

It is within the purview of the invention, as indicated in Fig. 8, to mount the mast upon a carriage of a form different from that illustrated in Figs. 1, 2 and 3, for instance upon one having a triangular shape, as shown at 13 in Fig. 8, and not adapted for travel upon railway tracks. In such event, three trucks of the caterpillar type would be used at the corners of the triangle, two such trucks 14 being power driven, and the third, numbered 15 in the drawings, being used as a steering means and being turned in one direction or the other either by hand or by power driven mechanism. The mast used upon such a carriage may be round or square in cross section, or it may be triangular to conform with the shape of the carriage, and thereby lend itself better to bracing.

Referring again to the preferred form of the invention shown in Figs. 1 to 5 inclusive, I have shown a lower mast section 16 mounted in the carriage at the center thereof. Its upper end is connected with the four corners of the carriage by braces 17, fabricated like the carriage and the mast itself of structural steel elements, whereby the carriage and lower mast section are united together rigidly. Upon the carriage outside the mast there may be located whatever enclosures are necessary for the protection of the machinery and controls employed. In the case illustrated these enclosures comprise a power house 18, a hoist or winch house 19, and an operator's control cab 20, the latter being elevated sufficiently to give the operator a clear vision.

Telescoping within the lower mast section 16 there is a second or intermediate section 21, and telescoping within that there is a third or upper mast section 22. It will be understood of course, that two sections only might be employed in some cases, and that more than three sections might be found desirable under certain circumstances, but for the larger dirigibles as now used, the three section mast is believed to afford the most effective and economical construction.

In each of the corners of the mast section 16 there are mounted two guides 23 spaced apart vertically a sufficient distance to provide a satisfactory slide bearing for the section 21. Similar guides 24 for the upper section are mounted in the corners of the middle section 21. In each of the guides 23 there are mounted two pairs of anti-friction wheels or rollers 25, and similar wheels or rollers 26 are mounted in the guides 24. All of these guides are so positioned that they will be in engagement with the guided section in all positions of the latter. It is more or less immaterial whether the guides be mounted upon the inner or the outer section of two telescoping sections, and it will be apparent furthermore that one set of four guides may be mounted upon one of two telescoping sections and the other set upon the other section, if desired. When the mast is completely collapsed, sections 21 and 22 will be enclosed or substantially enclosed in the lower section 16, as indicated in Fig. 2. Along corresponding sides of each of the three sections I mount ladders 27, 28 and 29, by means of which attendants may scale the mast, regardless of the height to which it may be extended.

At the top of the upper section 22 I mount a suitable mooring or attaching gear, generally indicated at 30 in the drawings. This gear, as previously stated, is preferably capable of manipulation so as to be directed toward the airship as it approaches the mast, and then to be drawn into and held in a vertical position. An airship moored to the mast is indicated in Figs. 1 and 2 of the drawings at 31.

Figure 9:
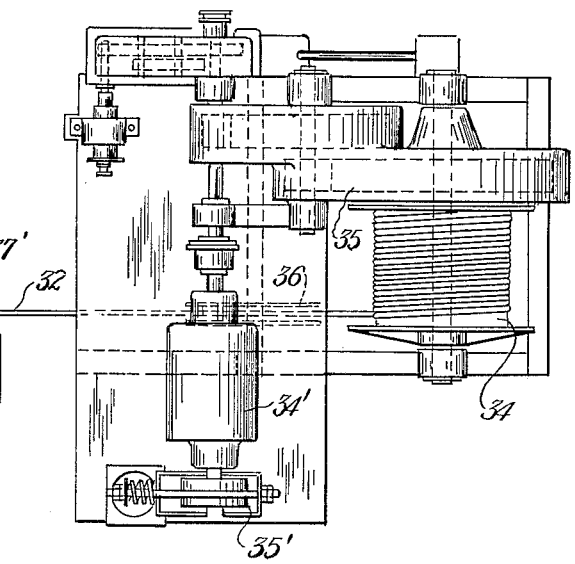
Fig. 9 is a plan view of the reeling apparatus for the mooring line.
Figure 10:
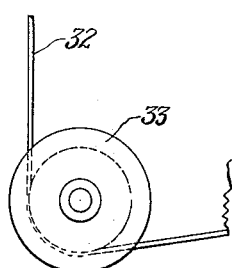
Fig. 10 is a side elevation thereof.

Referring now to Figs. 4 and 5, where the sections of the mast are shown in their extended positions, I have shown at 32 a mooring line extending downwardly past the mooring gear 30 and through the mast sections 22, 21 and 16, respectively, under a sheave 33, at the bottom of the mast and out to a winding drum 34 that may be located preferably in the house 19 on the carriage. The drum 34 may be a part of any suitable winding apparatus, such as the winding device shown in Figs. 9 and 10, where the drum is driven from an electric motor 34' through suitable gearing 35. As shown in the drawings, this winding device is preferably provided with a brake 35' on the motor shaft, and a shiftable sheave or fairlead 36 for laying the cable upon the drum.

Figure 11:
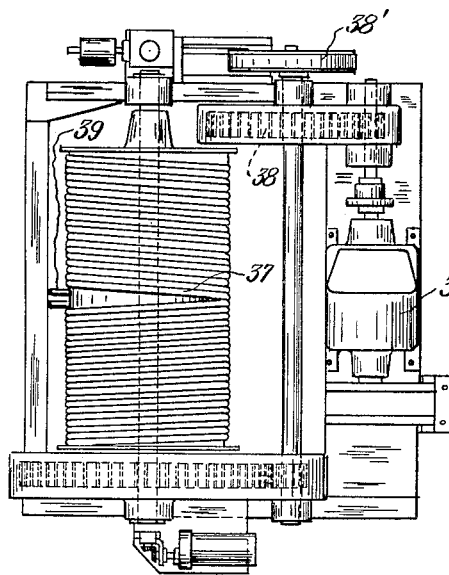
Fig. 11 is a plan view of the reeling apparatus for the mast extending means.
Figure 12:
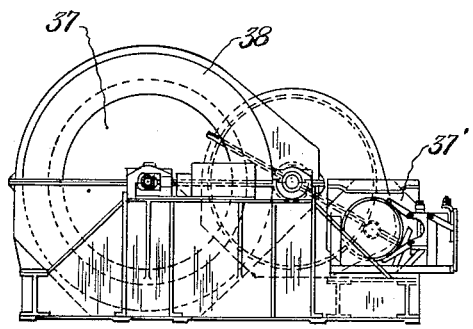
Fig. 12 is a side elevation thereof.

Another winding device embodying a drum 37, is also preferably located in the house or enclosure 19. This winding device may be of any appropriate form, such as that illustrated in Figs. 11 and 12, wherein the drum 37 is driven by an electric motor 37' through suitable gearing 38. A brake 38' of any suitable form may be associated with the shaft of the motor 37' to regulate the unwinding of cable from the drum 37. Upon this drum 37 there are wound the two ends of an endless cable 39. Both parts of this cable extend beneath sheaves 39' and 40 mounted near the base of the mast. This cable extends beneath the middle section 21 of the mast and up over sheaves mounted in opposed positions upon the lower section 16 of the mast, so that as the cable is shortened by being wound upon the drum 37, the middle section of the mast is necessarily elevated. Following the course of the cable, as illustrated in the present case, let us say that it extends upwardly from sheave 39' around sheave 40' supported by mast section 16, downwardly and under sheave 41 supported at the bottom of section 21 of the mast, horizontally beneath the latter section and around sheave 41' carried thereby, upwardly over sheave 42 carried by lower section 16 of the mast in a position opposite that of sheave 40', downwardly and under sheave 43 mounted upon the bottom of section 21 in line with sheave 41', horizontally across the bottom of section 21, upwardly around sheave 44 at the bottom of section 21 and over sheave 45 on section 16, downwardly around sheave 46 in line with sheaves 40 and 44, crosswise of section 21, and under sheave 47, upwardly over sheave 48 in line with sheave 42 downwardly under sheave 49 on the middle section, crosswise of that section under sheave 50, and thence upwardly and over a sheave 51 carried by section 16 of the mast, this sheave marking the middle point of the cable. In the operation of the hoisting means there is little movement of the cable over sheave 51, that is, only enough to equalize the lengths of the two runs of the cable on either side of the sheave 51. From this point the cable may be traced in its path around the following sheaves in the order named, 52, 53, 54, 55, 56, 57, 58, 59, 60, 61, 62, 63 and back under sheave 40 to winding drum 37.

The operation of the hoisting mechanism thus far described will be obvious from the above, the two runs of the cable 39 on either side of the sheave 51 being reeled in simultaneously by the drum 37. Inasmuch as the sheaves 40', 45, 57 and 63 and the sheaves 42, 48, 54 and 60 are mounted in a stationary position, the sheaves at the bottom of section 21 must be drawn upwardly, raising that section.

I have provided a novel means for raising the upper section 22 with respect to the middle section 21 by the very raising of the middle section. To this end cables are attached at their extremities to the lower section, and caused to run up over sheaves mounted at the upper end of the middle section, the middle portions of these cables running beneath the bottom of the upper section, or beneath sheaves carried in the bottom of that section. Hence, as the middle section rises, the portions of the cables between sheaves on the middle section are shortened, and the upper section is accordingly raised. As illustrated in Fig. 4, each of the four cables 64, 65, 66 and 67 is secured at one end to the lower section 16 of the mast. Each of them extends upwardly over sheaves 68, 69, 70 and 71, respectively, mounted at the upper end of section 21, downwardly beneath sheaves 72, 73, 74 and 75, respectively, mounted at the lower end of section 22, crosswise beneath that section and upwardly around sheaves 76, 77, 78 and 79, respectively also mounted on the lower end of section 22, and over sheaves 80, 81, 82 and 83 carried by the intermediate section 21, and downwardly, their ends being secured to an equalizer which consists of two plates 84 and 85 pivotally connected at 86 and 87 with brackets 88 and 89, which are pivotally connected at 90 and 91 with the mast section 16, and which are pivotally connected at 92 and 93 with an equalizing bar 94.

The true relation of the cables 64, 65, 66 and 67 is shown in Fig. 5, the spacing in Fig. 4 being adopted in order to illustrate without confusion the course of the cables. Any tendency toward variation in length between the cables 64 and 65 on one side of the mast is equalized by the movement of plate 84 on its pivot 86. Similarly any tendency toward variation in the length of the cables 66 and 67 is equalized by the movement of the plate 85 upon its pivot 87. Now, should there be any tendency for one side of the mast section 22 to move more rapidly than the other, as for instance, when there is a wind blowing toward the right in a plane parallel with the plane of the drawing in Fig. 5, the tension on the cables 64 and 65 will be relieved and that on the cables 66, 67 will be increased. The bar 94 then acts immediately under such conditions to equalize these tensions, for the plate 85 will swing bracket 89 counter-clockwise about its pivot 91, thereby creating a pull upon bar 94 which transmits a counter-clockwise swinging movement to plate 88, thereby adding an increment to the tension in cables 64 and 65, bringing about an equalization of the tension in the two sets of cables and returning the mast section 22 to a vertical position.

Of course it will be understood that where more than three sections are employed, the fourth section may be raised and lowered by the same type of cable arrangement as is here disclosed for the third section.

When the mast is to be lowered, the drum 37 is permitted to unwind at a controlled rate, lengthening the cable 39 beyond the sheaves 39' and 40, which greater length is taken up by the vertical portions of the cable, thereby lowering the middle mast section 21. This lowering of the middle section lowers the sheaves 68, 69, 70, 71, 80, 81, 82 and 83. As the latter sheaves descend the vertical portions of the cables 64, 65, 66 and 67 which are adjacent the ends of the cables become shortened, and the inner vertical portions of the cables increase in length accordingly. Hence the mast section 22 is lowered with respect to the section 21, and therefore descends more rapidly than section 21. Both sections arrive at their lowermost points simultaneously.

It has already been stated that my improved mooring mast embodies a self-propelling feature, and it should be understood that I regard this feature as an important part of my invention. Although any suitable form or arrangement of driving means may be employed for rendering the mooring mast self-propellent I prefer to employ an electric driving motor 96 for each of the trucks 11 and 11'. These driving motors are mounted directly on the trucks preferably in the location indicated in Figs. 13 and 14, the motor of each truck being adapted to supply driving torque to one of the truck axles through suitable gearing 97.

The trucks themselves may be of any suitable form of construction, such as that illustrated in the drawings, wherein each truck comprises spaced side frame members 98 which are supported upon journal portions projecting outwardly from the wheels, and a bolster 99 which extends transversely through the side frame members and is supported at its ends by the usual nested coiled springs 100.

The trucks are connected to the mast supporting framework or carriage 10 by means of pivotal connections established between the latter structure and the bolsters of the trucks. This pivotal connection may be of any suitable form, such as that illustrated in Figs. 13 and 15, wherein the bolster 99 is shown as having a bearing plate 101 thereon, and the carriage 10 is shown as being provided with a bearing member 102 which cooperates with the bearing plate of the bolster. Separation of the bearing member 102 from the bearing plate of the truck, in the event of tilting of the mast, is prevented by means of a transverse pin 103 which is mounted in lug-like extensions of the bearing plate of the bolster and which extends loosely through a slot 104 provided in the bearing member 102. The slot 104 is of such size and shape as to allow free swivelling movement between the trucks and carriage but prevents complete separation therebetween so that the trucks act as counterbalancing weights which oppose tilting of the mast.

The distance between the tracks 12 and 12' may vary somewhat, and accordingly, it may be desirable to provide for corresponding variation in the gauge or spacing of the pairs of trucks 11 and 11'. To this end the bolsters of one pair of trucks, in this instance the bolsters 105 of the trucks 11' which run on the track 12' are supported so as to be capable of lateral movement relative to the side frame members 106 of those trucks. In Fig. 16 of the drawings I have shown suitable mounting means which, when applied to the ends of the bolsters 105, provides for this relative movement. As illustrated, this form of mounting means consists in the provision of roller bearings 107 for supporting the ends of the bolsters 105, the roller bearings being supported on the bearing plate 108 which, in turn, is supported upon the coiled springs 109. With this arrangement it will be seen that while the spacing of the pivotal connections between the mast carriage and the trucks remains fixed, the distance between the pairs of trucks 11' and 11 may vary somewhat, by reason of relative movement occurring between the bolsters 105 and the frames 106 of the trucks 11'.

Electrical energy may be supplied, from any suitable form of generating apparatus, for operating the driving motors of the trucks and for operating the motors of the winding apparatus which is provided for extending the mast and hauling in the mooring line. In accordance with my invention, this generating means is located on the carriage 10, and is preferably of the type wherein the generator is driven by an internal combustion engine. In this instance I provide a generator 110 for supplying current to the driving motors of the trucks 11, and a similar generator 111 for supplying current to the drive motors of the trucks 11'. These generators are so arranged that they may be conveniently driven by an internal combustion engine 112. If desired an exciter generator 113 may also be driven from the internal combustion engine 112. This exciter generator supplies current for shunt field excitation of the generators 110 and 111, and may also supply current for driving various auxiliary apparatus. These generators, and the internal combustion engine for driving the same, are preferably arranged as a compact power generating unit, as illustrated in Figs. 17, 18 and 19. This power generating unit is located within the power house 18 with the radiator 114 of the internal combustion engine preferably located in one of the side walls of the house, and with the exhaust pipe 115 leading to a point exteriorly of the house.

Ordinarily during use of my mooring mast it is not desirable to extend the mast or to haul in on the mooring line at the same time that the mast supporting carriage is being propelled along the tracks. In other words, it is usually desirable to have the mast supporting carriage stationary while the mooring line is being hauled in or the mast is being extended, and vice versa, it is usually desirable to propel the carriage only when the mooring and mast extending winches have been properly secured. Accordingly, the power generating unit has been so designed that it may be used for supplying power either to the driving motors of the trucks, or to the motors 34' and 37' of the reeling aparatus. The supply of current to these two sets of driving motors may be selectively controlled by suitable apparatus mounted upon the control panels 116 and 117 which are located in the power house 18. This control apparatus includes throw-over switches of conventional form for connecting the power generating means for cooperation either with the driving trucks of the mast supporting carriage, or with the apparatus for extending the mast and hauling in the mooring line. Although I prefer to supply current to the sets of motors selectively, as explained above, if desired, however, the power generating unit may be of sufficient capacity to permit all of these motors to be operated at the same time.

The tracks 12 and 12' do not always extend in a straight line, but in some instances may be curved, making it necessary to provide for a speed differential between the driving trucks located on the different tracks, so that the trucks on the different tracks will be operated at the proper speed and will not cause skewing of the mast carriage. In other words, if the tracks extend on a curve, for example with the track 12 on the outside of the curve, it will be necessary to increase the speed of travel of the trucks 11 relative to the trucks 11' because otherwise the trucks 11 would lag behind the trucks 11' and cause skewing of the mast carriage.

As will be explained more fully hereinafter, the means which I provide for preventing or correcting such skewing of the carriage, involves the use of signaling means for indicating to the operator the angular position or squareness of the carriage, relative to the direction of the tracks, as well as means for controlling the speed of the trucks to prevent or correct the skewing.

Skewing of the carriage may also occur when the trucks are traveling along a straight trackway, such as when the wheels of the trucks 11 slip on the rails without such corresponding slippage occurring at the same time between the track 12' and the wheels of the trucks 11'. Ordinarily, however, all of the trucks operate at the same speed on straight portions of the track, and since most of the skewing occurs on track curves, I have described the skew control and indicating means which I employ, particularly in connection with the travel of the mast carriage along curved track sections. It should be understood, however, that the skew control and indicating means is capable of functioning in the case of skewing on straight track as well as for the skewing which occurs at the track curves.

For indicating the angular position or squareness of the carriage relative to the tracks, to the operator located within the control cab 20, I provide signaling apparatus which is capable of continuously supplying visible indications for conveying this information to the operator. This signaling apparatus, is in itself, a well known form of apparatus which may consist of a transmitter 120 located on one of the driving trucks, and a receiver 121 located in the operator's cab 20. The transmitter and receiver are of similar construction, each being a synchronous electrical device having a field winding 122, and a movable armature provided with a winding 123 which is continuously energized by alternating current obtained from the line conductors 124. The transmitter is mounted upon a suitable support 125 which is attached to the mast carriage 10.

Movement is imparted to the armature of the transmitter by mechanism depending for its actuation on relative movement occurring between the bolster of the truck with which the apparatus is associated, such as one of the trucks 11, and the mast supporting structure 10. In this instance this actuating mechanism comprises a pinion 126 having its shaft 127 connected to the armature of the transmitter by a suitable coupling 128, and a sector 129 which meshes with the pinion 126 and is actuated by linkage operatively connected to the sector shaft 130. This linkage includes a lever 131 carried by the sector shaft, and a connecting rod 132 having one end thereof pivoted to the lever and its other end pivoted to an anchor member 133 which is rigidly secured to the top of the bolster 99. With this arrangement it will be seen that as the truck swings relative to the mast carriage, as when skewing occurs, motion will be transmitted through the connecting rod 132 and the sector 129, causing rotation of the armature of the transmitter.

It is characteristic of signaling apparatus of this kind that when the armature of the transmitter is rotated, the armature 134 of the receiver will also be rotated to assume the same angular position as the armature of the transmitter. In this instance the armature 134 of the receiver is operatively connected with a pointer 135 which cooperates with the dial 136 to give visible indications of the relative position of the truck.

For automatically controlling the speed of operation of the trucks, so as to prevent skewing of the carriage as the latter is propelled around a curve, I provide means for increasing the speed of the driving motors for the trucks which travel along the outside of the curve, and which, for purposes of illustration may be assumed to be trucks 11. This control means includes a limit switch 138 which is actuated by relative movement between the bolster of one of the trucks 11 and the mast carriage 10. This limit switch may, if desired, be mounted upon the same support as the transmitter 120 of the signaling apparatus, and so arranged that it is actuated by movement of the pinion shaft 127. Any suitable actuating mechanism may be employed for obtaining the desired operation of the limit switch, and in this instance I show a cam 139 mounted upon the pinion shaft 127 for cooperation with the movable arm 140 of the limit switch 138.

Figure 22:
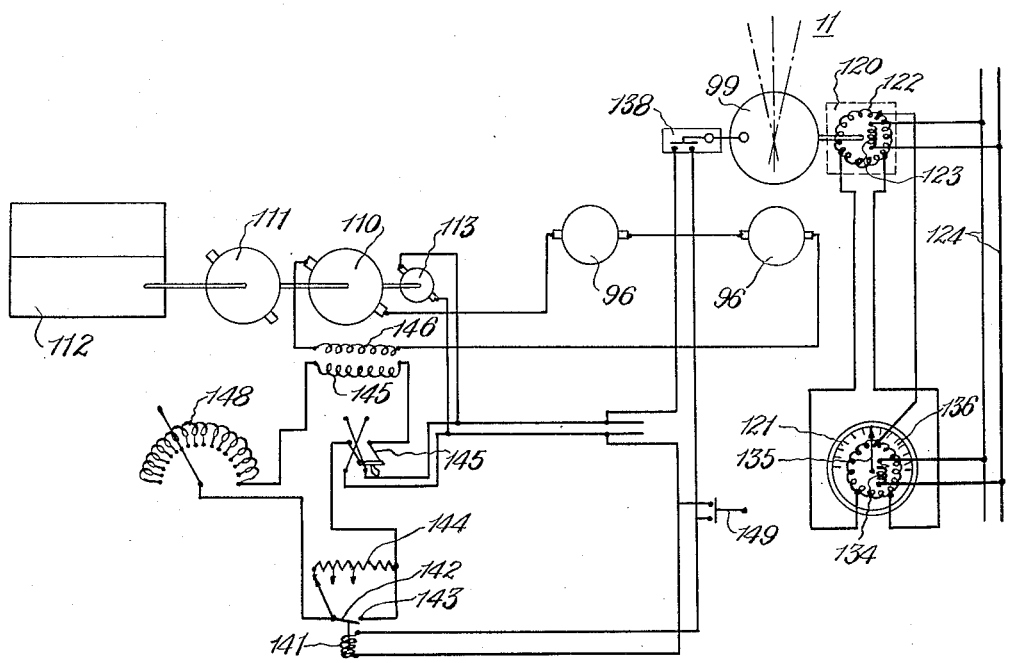
Fig. 22 is a wiring diagram.
Figures 20, 21:
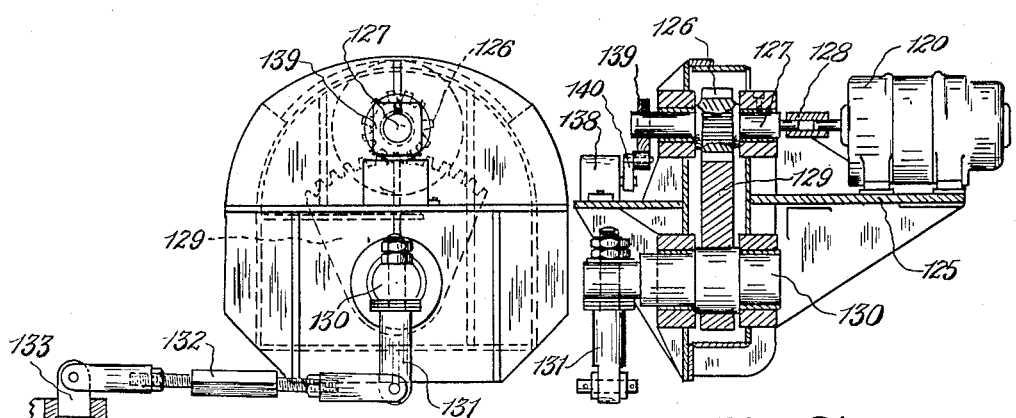
Fig. 20 is a side elevation showing a part of the skew control apparatus.
Fig. 21 is an elevation, partly in section, of the apparatus of Fig. 20.

As shown in the wiring diagram of Fig. 22, the limit switch 138 controls an electromagnetic switch 141. The latter switch has a movable contact member 142 which, when in the closed position, engages a contact member 143 and short-circuits the resistance 144. When the electromagnetic switch 141 is open the resistance 144 is in series with the shunt field winding 145 of the generator 110. In the wiring diagram the generator 110 is represented as having a series field winding 146, and as having the driving motors 96 of the two trucks 11 in its load circuit. The shunt field winding 145 is energized by the exciter generator 113 which also supplies current for energizing the winding of the electromagnetic switch 141. A suitable reversing switch 145' may be included in the shunt field circuit so that by reversing the polarity of the shunt field of the generator 110 the direction of the motors 96, and likewise the direction of travel of the carriage, may be reversed.

From the arrangement just described, it will be seen that when sufficient relative movement occurs between the mast carriage 10 and the truck 11 with which the control means is associated, the switch 138 will be closed, causing the electromagnetic switch 141 to be energized. The energization of this switch causes the contacts 142 and 143 to be closed and the resistance 144 short-circuited out of the circuit of the shunt field winding 145. The removal of the resistance 144 from the shunt field circuit causes the field excitation of the generator 110 to be increased, with the result that additional current is generated and supplied to the driving motors 96. The increased supply of current to these motors causes them to be speeded up relative to the driving motors of the trucks 11' to thereby prevent or correct skewing of the carriage. After the curve has been rounded, or the speed of the trucks has been regulated to correct the skewing, as the case may be, the truck returns to its normal position relative to the carriage, which results in the switch 138 being opened. The opening of switch 138 causes the electromagnet 141 to be deenergized which allows the contact 142 to drop open and the resistance 144 is thereby reinserted into the shunt field circuit. The excitation of the generator 110 now being decreased, the supply of current to the motors 96 is correspondingly decreased with the result that the speed of the trucks 11 is reduced to a speed of operation equal to that of the trucks 11'.

Since the increase in speed, required for the trucks following the outside of the curve, to thereby prevent skewing, may be computed mathematically from a knowledge of the radius of curvature of a given track curve, the value of the resistance 144 can readily be determined. When this has been done the resistance 144 may be adjusted to the determined value, and thereafter the speed of the trucks will be automatically regulated by means of the switch 138 inserting and removing this resistance from the shunt field circuit at the proper time.

The speed of operation of the motors 96 may be regulated independently of the automatic skew control means, by use of a suitable rheostat 148 located in the circuit of the shunt field winding 145.

As explained above the switch 138 is actuated when a predetermined relative movement occurs between the supporting structure and the truck with which the control means is associated. To enable the operator to exercise an additional control over the speed of the motors 96 to thereby prevent or correct skewing, without waiting for the automatic operation of the switch 138, I provide a push button switch 149. This push button switch is also located in the control cab 20, and when the operator observes from the dial 136 that skewing of the supporting structure is taking place, by reason of the trucks 11 lagging behind the trucks 11', he can close the switch 149 to thereby cause the resistance 144 to be short-circuited out of the shunt field circuit and the motors 96 speeded up in the same manner as if this resistance had been short-circuited by the automatic actuation of the switch 138. When the dial 136 indicates that the skewing has been corrected the switch 149 is opened by the operator to reduce the speed of the trucks 11 to their normal speed. Although the operator may use the push button switch 149 to the exclusion of automatic control by the switch 138, ordinarily the switch 149 is intended for use in correcting small skew angles, such as might occur during travel of the carriage along straight track sections.

In describing the signaling apparatus and the automatic skew control means, I have referred to the same as being associated with only one of the trucks 11, but it should be understood that my invention contemplates the use of duplicate apparatus with both of the trucks 11, and if desired duplicate signaling and control apparatus may also be applied to one or both of the trucks 11'. It is pointed out, by way of explanation, that if the trackway upon which the mast is to be operated, curves in such direction that trucks 11 always travel on the outside of the curve, then skew control and indicating means applied to both trucks 11 would effectively prevent skewing on the curves during travel of the carriage in either direction along the track. If the trackway curves in opposite directions so that trucks 11' also travel at times on the outside of the track curves, then it would be desirable to have the skew control and indicating apparatus applied to all four trucks so that the speed of the outside trucks could always be regulated to prevent skewing during travel of the carriage in either direction. Although I have consistently described the skew control means as operating to correct or prevent skewing by increasing the speed of travel of the trucks following the outside of the curve, but obviously substantially the same result can be obtained by employing the control means to slow down the speed of travel of the trucks following the inside of the curve, or if desired, a combination of these functions could be had by simply selecting the proper arrangement of the control means illustrated including a suitable number and arrangement of contacts for the switch 138.

While the more general use of mooring masts of the character herein disclosed will be on land, it is not my intention to so limit the present invention, as a mast incorporating many of the features herein disclosed may be mounted on the deck of a ship, barge, pontoon, or any other floating structure. In such applications, excepting in the case of a floating hangar, the mooring mast would be preferably, although not necessarily, rigidly secured at its base to the floating structure on which it is mounted.

Having thus described my invention, I claim:

1. A mooring mast comprising a plurality of telescoping sections, means for bracing the lower section against movement away from a vertical position, and means for simultaneously raising or lowering each upper section with respect to the section just below it until the mast is fully expanded or contracted.

2. A mooring mast comprising a plurality of telescoping sections, means for bracing the lower section against movement away from a vertical position, a power hoist, means operatively connected with said power hoist for raising and lowering the second section, and means operatively connected with the second section for raising and lowering the third section with respect to the second section simultaneously with the movements of the second section.

3. A mooring mast comprising a plurality of telescoping sections of polygonal cross section, means for bracing the lower section against movement with respect to its axis, power means for raising each of the upper sections with respect to the section next beneath, and two sets of vertically spaced guides in the corners of one of the sections, each of said guides having anti-friction rollers therein for engaging the section telescoping therewith.

4. A mooring mast comprising a plurality of telescoping sections of polygonal cross section, means for bracing the lower section against movement with respect to its axis, power means for raising each of the upper sections with respect to the section next beneath, and two sets of vertically spaced guides in the corners of one of the sections, each of said guides having a pair of rollers therein for engagement with the section telescoping therewith, one of the rollers of each pair being arranged with respect to the other roller of the pair at an angle corresponding to the corner angles of the sections.

5. A mooring mast comprising three telescoping sections, the second or middle section carrying two oppositely arranged sheaves turning on horizontal axes, a cable attached at its ends to the first or lower section, said cable extending upwardly from each of its ends over said sheaves and having its middle portion extending downwardly beneath the third or upper section, whereby the raising or lowering of the second section will cause the third section to rise or descend simultaneously, not only with respect to the first section but with respect to the second section as well.

6. In aircraft mooring apparatus the combination of a base structure, a mooring mast supported on said structure, a plurality of trucks for movably supporting said structure including a pair of propelling trucks arranged with one truck of said pair on each side of the longitudinal center line of the structure, power means on said structure for cooperation with said pair of trucks for propelling the structure, and means associated with said pair of trucks for regulating their relative speeds to thereby prevent skewing of said structure.

7. In aircraft mooring apparatus the combination of a base structure, a mooring mast supported on said structure, a plurality of laterally spaced tracks, a plurality of laterally spaced trucks adapted to cooperate with said tracks for movably supporting said structure, power generating means on said structure for supplying a propelling force to said trucks, and means for selectively controlling the speed of operation of said trucks to prevent skewing of said base structure.

8. In aircraft mooring apparatus the combination of a base structure, a mooring mast supported on said structure, a plurality of spaced tracks, a plurality of trucks adapted to cooperate with said tracks for movably supporting said structure, power generating means on said structure for supplying a propelling force to said trucks, means for indicating changes in the rate of travel of one of the trucks of said structure relative to another of said trucks, and means for controlling the speed of operation of said trucks in accordance with the indications given by said indicating means to thereby prevent skewing of said structure.

9. In aircraft mooring apparatus the combination of a carriage, a mooring mast on said carriage, a pair of spaced tracks, a plurality of trucks swiveled to said carriage and adapted to run on said tracks, means for propelling said carriage including individual driving motors for said trucks and generating means mounted on the carriage and adapted to supply power to said motors, and means responsive to changes in the positioning of said trucks relative to said carriage for automatically controlling said motors to thereby prevent or correct skewing of the carriage.

In testimony whereof, I hereunto affix my signature.

PAUL H. DOUGLAS.